United States Patent [19]

Ward, Jr.

[11] 4,015,967

[45] Apr. 5, 1977

[54] METHOD FOR SHEARING AND TURNING THE GLASS GOB

[75] Inventor: William R. Ward, Jr., Columbus, Ohio

[73] Assignee: Owens-Illinois, Inc., Toledo, Ohio

[22] Filed: Mar. 31, 1976

[21] Appl. No.: 672,214

[52] U.S. Cl. .................................. 65/133; 65/334
[51] Int. Cl.² .......................................... C03B 5/38
[58] Field of Search ............................. 65/133, 334

[56] References Cited

UNITED STATES PATENTS

| | | | |
|---|---|---|---|
| 2,401,994 | 6/1946 | Weber | 65/133 |
| 3,160,493 | 12/1964 | Kuppers | 65/133 |
| 3,205,746 | 9/1965 | Copeland | 65/133 X |
| 3,607,208 | 9/1971 | Kapral | 65/133 X |
| 3,800,344 | 4/1974 | Keyne | 65/133 |
| 3,918,951 | 11/1975 | Kitayama et al. | 65/133 X |

*Primary Examiner*—S. Leon Bashore
*Assistant Examiner*—F. W. Miga
*Attorney, Agent, or Firm*—Steve M. McLary; Edward J. Holler

[57] ABSTRACT

A method and apparatus for shearing an elongated gob of glass from the end of a vertically flowing stream of molten glass and tilting the severed gob from its vertical orientation toward a horizontal orientation. A pair of shear blades are mounted for horizontal reciprocation between open and closed positions. In the closed position, the blades are overlapped generally in the center of the stream of molten glass and thereby shear a single gob from the stream. The movement of the blades is so controlled that the lower blade moves appreciably beyond the stream centerline. The upper blade has completed its stroke and is returning to its open position while the lower blade continues its over center travel. The difference in travel is caused by a difference in the length of the drive linkages between the upper and lower shear blades. The net result of the total cycle is to cause the severed gob to rotate about 90° in mid-air before entering a forming mold.

3 Claims, 4 Drawing Figures

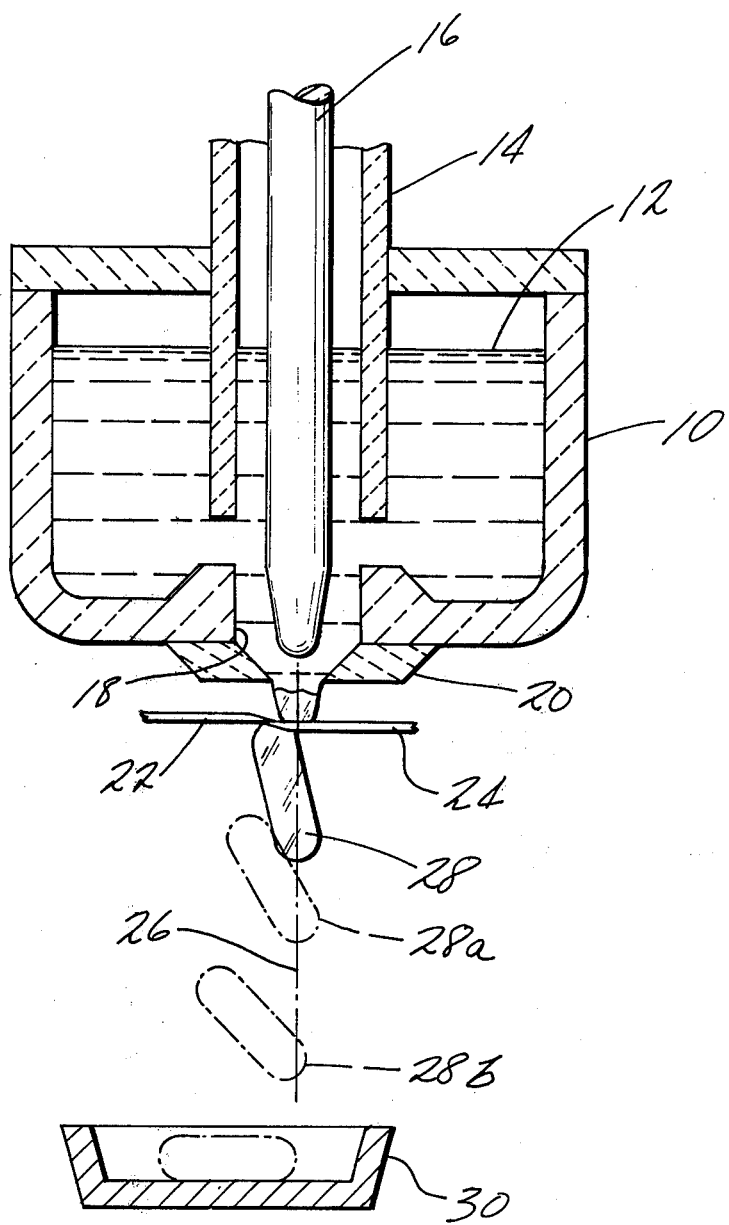
FIG_1

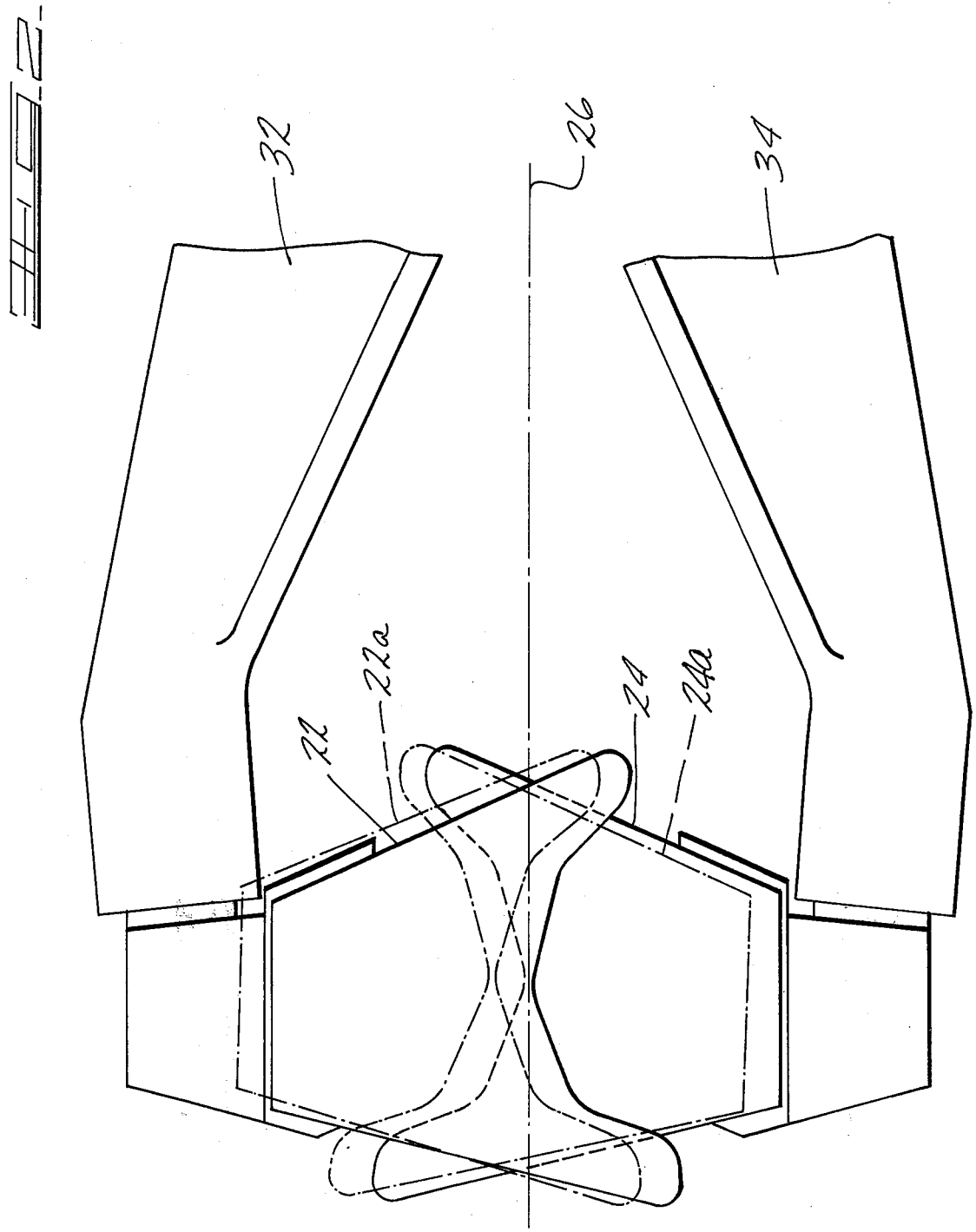

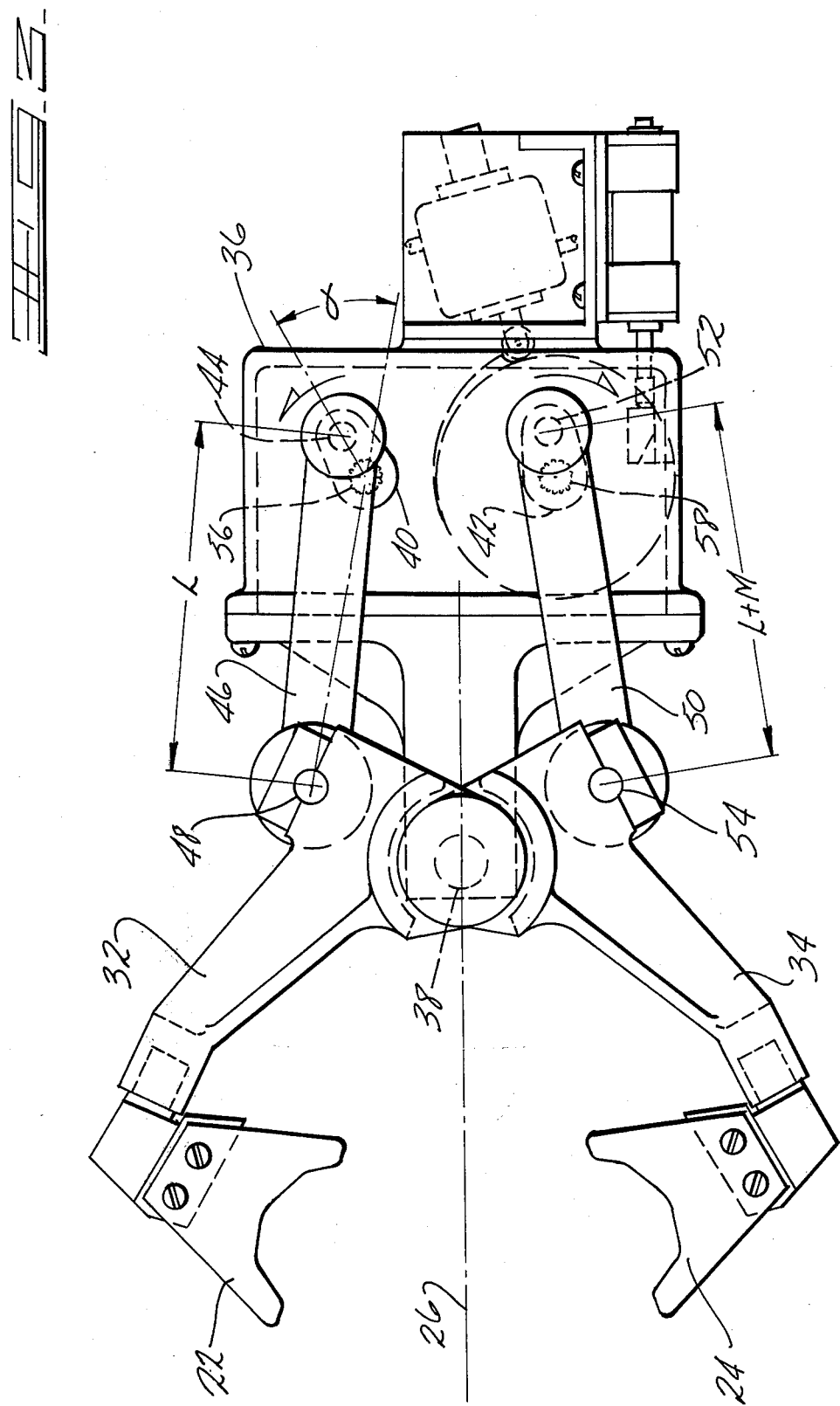

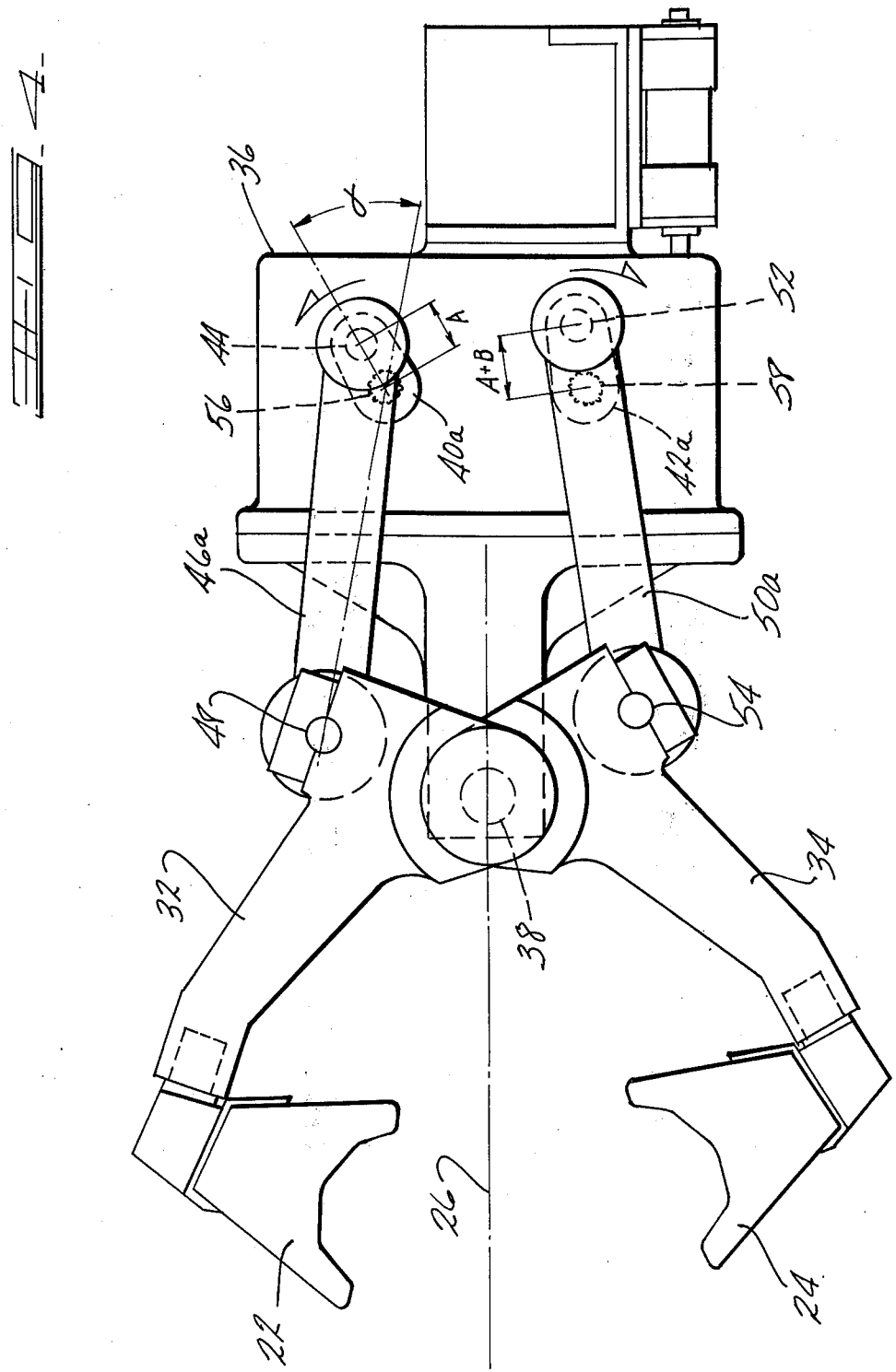

METHOD FOR SHEARING AND TURNING THE GLASS GOB

BACKGROUND OF THE INVENTION

This invention generally relates to the shearing of discrete gobs from a vertically flowing stream of molten glass. More particularly, this invention relates to an improved mechanism and method to achieve this shearing. Specifically, this invention relates to such an improved mechanism which will cause a severed gob to turn from a vertical towards a horizontal orientation as it falls toward a forming mold.

The rectangular face plates of television picture tubes are produced in horizontally disposed, open top molds. It is desired in this operation to deliver severed charges or gobs of molten glass into the molds such that the vertical axis of the gob as severed lies along the horizontal axis of the mold. That is, the gob turns through about 90° during its fall into the mold. In prior art methods of severing and tilting the gob, a pair of moving blades sever the glass and a knocker, attached to the underside of the lower blade, strikes the gob on its top end during severing and tilts the gob from a vertical towards a horizontal position. Differential blade thickness have also been used to achieve the same results. Also, a gob may be tilted by merely allowing the lower blade to become dull. The following U.S. Pat. Nos. are examples of the prior art: 1,950,339; 2,271,004; 2,812,619; and 3,607,208.

All of these prior art methods produce a blemish, known as a shear mark, on the finished glass product. This results from uneven cooling of the gob primarily due to excess contact between the hot gob surface and a relatively chilled surface portion of the shearing and tilting means. In the case of the dull shear blade, a ragged edge having thin glass spurs projecting from it was formed. I have found that the desired tilting may be achieved with minimal damage to the gob by causing the lower shear blade to over-travel the center of the glass stream during the cutting stroke.

SUMMARY OF THE INVENTION

This invention relates to a method and apparatus for severing a gob of glass from the end of a vertically flowing stream of molten glass and simultaneously tilting the severed gob away from the vertical stream axis toward the horizontal. The method includes advancing one of an opposed pair of shear blades horizontally toward the centerline of the glass stream. Simultaneously, the other blade is also advanced toward the centerline until the two blades overlap, generally at the centerline of the stream, to thereby shear the gob. The upper blade member is then withdrawn from the overlapping position toward a rest position while the lower blade member is advanced beyond the stream centerline. Then the other blade member is also withdrawn toward a rest position.

BRIEF DESCRIPTION OF THE DRAWINGS

FIG. 1 is a schematic, side elevation cross section of the discharge section of a glass melting furnace showing the severing and tilting of a gob from a molten glass stream;

FIG. 2 is an enlarged, fragmentary top plan view showing the relative positions of the shear blades at two locations during a shearing cycle;

FIG. 3 is a top plan view of one type of drive mechanism, for glass shears, which embodies the present invention; and FIG. 4 is a view substantially identical to claim 3 but with different members in the drive train being of differential lengths to achieve the ends of the present invention.

DETAILED DESCRIPTION OF THE DRAWINGS

FIG. 1 shows a feeder bowl 10 which contains molten glass 12. This is a basically standard configuration in the glass forming industry for the delivery of molten glass to the utilization machinery. The level of the glass 12 within the feeder bowl 10 is in part controlled with a movable tube assembly 14. A reciprocating refractory material plunger 16 moves up and down within the mass of molten glass 12 and forces glass through an opening 18 in the bottom of the feeder bowl 10. A refractory orifice ring 20 surrounds the opening 18 and in part helps shape the stream of molten glass emerging therefrom. It is well known and conventional to shear the stream of molten glass, as it exits from the orifice ring 20, into discrete charges or gobs of glass. As has been pointed out, in the formation of television picture tube face plates, it is desirable that these gobs of glass be changed during their fall from a vertical to a horizontal orientation. The present invention is designed to accomplish this with minimum thermal damage to the gob of glass and with a degree of simplicity in mechanism which has heretofore been unattainable.

As is seen in FIG. 1, there are two shear blades which cut or sever the stream of molten glass 12. There is an upper blade 22 and a lower blade 24. A vertical centerline 26 has been placed in FIG. 1 as a reference point for a fuller understanding of the precise operation of this mechanism. The centerline is simply a reference point to allow better visualization of precisely what occurs during the glass severing operation. The upper and lower blades 22 and 24 overlap one another at precisely the centerline 26. At this point, the stream of molten glass issuing from the orifice ring 20 is severed into a discrete gob of glass 28. The relative positions of the upper and lower blades 22 and 24 as seen in FIG. 1 is that which occurs slightly after the gob 28 has been completely severed. At this point, the lower blade 24 has slightly overtravelled the centerline 26 while the upper blade 22 has begun its withdrawal from the centerline 26. The lower blade 24 will begin its withdrawal sometime after the position shown in FIG. 1. The net result of this motion is that the lower blade 24 actually pushes the gob 28 toward the left as seen in FIG. 1. The positions shown in phantom lines of the gob 28, designated as 28a and 28b show how the gob 28 turns 90° with respect to its axis during its fall from the point of being sheared into an open topped glass forming mold 30. Thus, the gob 28 lands in the mold 30 in a position which is particularly desirable for further processing of the gob into a face plate of a television picture tube.

FIG. 2 illustrates on a much larger scale the relative overlap and motion of the upper blade 22 and the lower blade 24. The upper blade 22 is carried and moved by an upper shear arm 32 while the lower blade 24 is carried by a lower shear arm 34. The centerline designated as 26 in FIG. 2 is the same relative centerline as seen in FIG. 1. It is again presented for purposes of orientation. The upper and lower blades 22 and 24 shown in full line in FIG. 2 are seen to be slightly overlapping the centerline 26 at the time they both come together. This overlap is set before the blades are assembled into the shearing mechanism and is a constant function of the mechanism. It is particularly desirable that the blades both meet at the centerline 26 at approximately the same time so that there is an even overlap of the blades and a uniform shearing action across the stream of molten glass. It may be seen that there is a basically even overlap of the upper and lower blades 22 and 24 across the centerline 26. It is at precisely this overlap that the final shearing of the molten glass takes place. However, the dot dash lines for the blades 22 and 24 show approximately the position of the blades in FIG. 1. These positions, designated as 22a and 24a, show that the lower blade moves an appreciable distance beyond the centerline 26. However, while the lower blade 24 is moving beyond the centerline the upper blade 22 has ceased its movement toward the lower blade 24 and is retreating away from the centerline 26. Thus, the position 22a in FIG. 2 shows that the upper blade 22 has moved away from the centerline 26 and no additional overlap of the blade occurs. This is important to ensure that equal or uneven blade wear does not occur. Thus the motion of the lower blade 24 forces the severed gob 28 to begin its 90° rotation during free fall.

As has been explained, the basic principle behind the present invention is one of making one of the links which drive the blades to be longer than the other. This in turn then causes the blade having the longer drive length to over travel slightly the absolute centerline position. It is, of course, evident that the lower blade 24 is the blade which should preferably over travel the center position since the upper blade 22 has lost contact with the severed glass gob at the time the severing is completed. Therefore the motion of the lower blade 24 may shove the gob and give it the desired turning momentum. There are numerous forms of shear mechanisms now in common use in the glass industry. It is basically immaterial which particular mechanism is used to achieve the purpose of the present invention, so long as it is possible to achieve the differential link sizes required. For example, a mechanism which is suitable may be seen in U.S. Pat. No. 3,736,826, the teachings in which are hereby incorporated by reference. Another U.S. Patent which shows a shear mechanism which can be used is U.S. Pat. No. 2,812,619, the teachings of which are hereby incorporated by reference.

The specific examples which will be shown in FIGS. 3 and 4 use the mechanism of U.S. Pat. No. 3,736,826, but those skilled in the art will realize how the teachings with respect to this particular mechanism may be readily incorporated into any of the commonly used gob shearing devices.

The top view of FIG. 3 shows a drive mechanism pivot point propelling the upper and lower blades 22 and 24 in their path of motion toward and away from the issuing stream of molten glass. Once again, the centerline 26 is provided to give a point of reference. Obviously, the blades 22 and 24 are shown in their fully open position in FIG. 3. A gear box 36 contains the basic drive components of this mechanism and is suspended from below the feeder bowl 10 in normal operation. The upper and lower shear arms 32 and 34 are both rotatably mounted upon a common freely rotating shaft 38. The shaft 38 is an unpowered shaft and serves as a pivot for the arms 32 and 34. Two crank arms 40 and 42 are driven by the mechanism within the gear box 36. The crank arm 40 in turn, through a pivot pin 44, is connected to a link arm 46. The link arm 46 is pivotally connected to the upper shear arm 32 through a pivot pin 48. In a similar fashion, crank arm 42 is connected to a second link arm 50 through a pivot pin 52. The link arm 50 is connected to the lower shear arm 34 through a pivot pin 54. It is quite evident in the mechanical drive shown that rotation of the crank arms 40 and 42 will drive the link arms 46 and 50 which in turn will force the upper and lower shear arms 32 and 34 toward the centerline 26. This motion will culminate with the overlap of the upper and lower blades 22 and 24 over the centerline 26. This motion of course causes shearing of the issuing stream of molten glass. This particular type of motion is basically conventional and well known in the art. However, note that is FIG. 3 the link arms 46 and 50 are not symmetric. The cranks 40 and 42 are substantially identical, and the upper shear arms 32 and 34 are substantially identical. Thus if the crank arms link arms 46 and 50 were the same length, the blades 22 and 24 would come to a common point, halt, and be retracted. Note through that the distance L between the centerlines of the pivot pins 48 and 44 is smaller than the distance L plus M between the pivot pins 52 and 54. This difference in length means that with the cranks 40 and 42 driving both elements a common distance, the lower blade 24 will be moved beyond the centerline 26 while the upper blade 22 will not be so moved. This is precisely the motion which was illustrated in FIGS. 1 and 2, and FIG. 3 thus clearly shows the configuration of the drive train to allow such motion to be accomplished.

FIG. 4 utilizes a mechanism basically identical to that shown in FIG. 3, but incorporates a somewhat different modification in the drive linkage to accomplish the same result. Identical elements from FIG. 3 are given identical numerals in FIG. 4, and it is believed the sufficient description was given with respect to FIG. 3 that these elements need not be described again. The basic difference between FIGS. 3 and 4 are twofold. First, the links 46a and 50a are of identical length in FIG. 4, as opposed to the differential lengths of these links shown in FIG. 3. In FIG. 4, the difference in total linkage path to achieve the movement of the lower blade 24 pass the centerline 26 is accomplished through a difference in the lengths of the crank arms designated as 40a and 42a. The crank arm 40a is driven by a gear 56 from within the gear box 36. A similar gear 58 drives the crank arm 42a. The distance from the center of the gear 56 to the pivot pin 44 is designated as A for crank arm 40a. The distance from the center of the gear 58 to the center of the pivot pin 52 is a slightly longer distance for the crank arm 42a and is designated as A+B. As was the case in FIG. 3 with the differential distances L and L+M, the differential distances A and A+B of the crank arms 40a and 42a provide for a difference in the total path of movement of the upper and lower blades 22 and 24. By virtue of this longer length, the crank arm 42a will cause the lower blade 24 to travel past the centerline 26 and again push the falling glass gob 28 to allow 90° rotation during its fall into the mold 30.

One final feature of the present invention requires clarification. In both FIGS. 3 and 4, the centerline of pivot pin 52, pivot pin 54, and gear 58 all lie on a common line. The centerline of pivot pin 48 and gear 56 lie on a common line also. However, the center of pivot pin 44 is offset from the line by an angle $\alpha$. The angle α is designed to advance the phase of the linkage including upper shear arm 32 relative to the linkage including the lower shear arm 34. This advance is required to insure that the two blades 22 and 24 both meet in the center at the same time. Without the advance, the longer length of the crank 42 would cause the blade 24 to arrive at the center before the blade 22, causing erratic cutting and loss of control of the severed gob. The angle α is a function of the total linkage involved and, since many possible drive mechanisms can be used with this invention, is best stated as being in the range of from about 5° to about 45°.

What I claim is:

1. A method for shearing gobs of glass from a vertically flowing stream of molten glass wherein lateral motion is imparted to the gob being sheared, which comprises the steps of:

advancing one of an opposed pair of shear blades horizontally toward the centerline of said glass stream;

simultaneously advancing the other one of said opposed pair of shear blades horizontally toward said centerline of said glass stream;

overlapping said pair of shear blades at approximately said glass stream centerline to thereby shear said gob from said glass stream;

withdrawing said first mentioned shear blade from said glass stream centerline while continuing to maintain said pair of shear blades in an overlapping configuration;

advancing said second mentioned shear blade to a location beyond said glass stream centerline in the direction of withdrawal of said first mentioned shear blade in synchronism with the withdrawal of said first mentioned shear blade to thereby maintain overlapping configuration of said pair of shear blades, whereby the travel of said second mentioned shear blade beyond said glass stream centerline in synchronism with said first mentioned shear blade will cause a lateral motion of said gob being sheared; and withdrawing said second mentioned shear blade from the position it attained beyond said glass stream centerline.

2. The method of claim 1 wherein said blades contact opposed surfaces of said glass stream substantially simultaneously.

3. The method of claim 1 wherein said blades reach the centerline of said glass stream substantially simultaneously.

* * * * *